J. TILTON,

Assignor of one-half to R. M. STIVERS.

Spring for Vehicles.

No. 9,542. Reissued Jan. 25, 1881.

WITNESSES:

John Blake

Lovington Gifford

INVENTOR:

Joseph Tilton

BY Gifford & Gifford

ATTORNEYS.

N. PETERS, PHOTO-LITHOGRAPHER, WASHINGTON, D. C.

UNITED STATES PATENT OFFICE.

JOSEPH TILTON, OF NEW YORK, N. Y., ASSIGNOR OF ONE-HALF TO RUFUS M. STIVERS, OF SAME PLACE.

SPRING FOR VEHICLES.

SPECIFICATION forming part of Reissued Letters Patent No. 9,542, dated January 25, 1881.

Original No. 157,430, dated December 1, 1874. Application for reissue filed November 27, 1880.

*To all whom it may concern:*

Be it known that I, JOSEPH TILTON, of the city, county, and State of New York, have invented certain Improvements in Springs for Vehicles, of which the following is a specification.

The object of the present invention is to provide springs designed especially for buggies, carriages, and other light vehicles, which shall obviate all rocking motion of the body supported thereon and cause the latter to be always maintained in a horizontal position when moving up or down or when in a stationary position.

The invention consists in the employment of two independent crossed leaf-metal springs, the ends of which are rigidly secured to the opposite ends of a cross-piece attached to the body, each spring preferably being formed or provided with a socket, and the two sockets meeting each other at the center of the cross-piece attached to the body so as to enable an axis or pivot-bolt to be passed through both sockets for enabling the springs to turn thereon when the body is elevated or depressed.

The invention further consists in securing a bearing and re-enforcing plate of metal to the under side of the cross-piece attached to the body, said plate being provided with pendent flanges at both ends to serve as bearing-points for the ends of the springs in order to prevent any lateral movement of the same, and to serve, in connection with fastening-bolts, to securely hold the springs in place.

Figure 1:
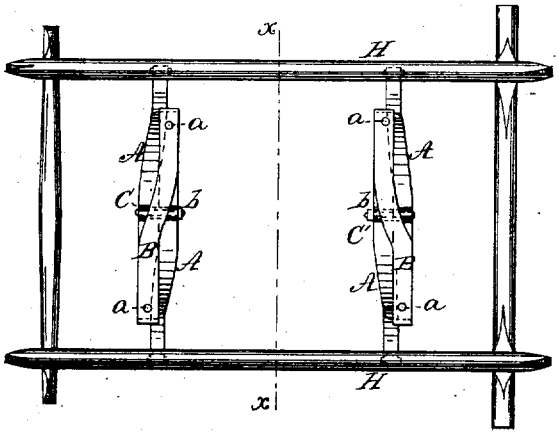
Figure 2:
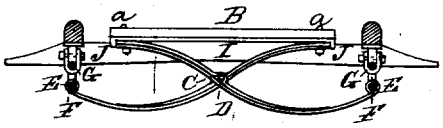
Figure 3:
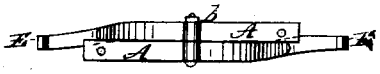

In the accompanying drawings, Figure 1 is a top or plan view, representing my improved spring attached to the side sills of the platform-gear. Fig. 2 is a transverse section of the same, taken on the line *x x*, Fig. 1. Fig. 3 is a top or plan view of the springs crossed and pivoted together, their cross-piece being removed.

It is well known that elliptic or semi-elliptic springs secured to the center of the cross-piece attached to a carriage-body will permit the same to rock from side to side, which is objectionable for various reasons.

I propose to maintain a buggy, carriage, or other vehicle body always in a horizontal position in respect to the springs and running-gear, and this is accomplished by employing a pair of springs, A A, which may properly be termed "sections of semi-elliptic springs." The springs are arranged to cross each other at the center of the cross-piece B, attached to the carriage-body, and their elevated or upper ends are permanently secured, at the opposite ends of said cross-piece, by means of bolts and nuts *a*. Each spring is preferably provided with a socket, C, at the crossing-point, and through said sockets, which are thus brought in a line with each other, an axis or pivot bolt, B, is passed. A nut, *b*, is applied to the screw-threaded projecting end of the bolt for securing the same in place. Each spring is generally formed of two or more leaves—a long lower leaf and a shorter upper leaf—this construction being resorted to in order to obtain greater strength, and to enable the socket C to be more readily formed.

When two leaves are employed the socket is made by bending the upper leaf so as to form a semicircular or curved portion, and then, by applying the other leaf, a complete closed socket for the axis-pin is provided. The socket can also be made by dispensing with one leaf and welding or riveting a short piece over the curved or semicircular seat portion.

It is evident that a semicircular socket may be formed in each leaf, so that when brought together a circular socket or seat will be formed, in either case not impairing the strength, beauty, or finish of the spring.

In order to prevent the separation of the leaves at the point where the socket is located there should be inserted through both leaves, on each side of the socket, one or more rivets, so as to enable the spring to resist the strain to which it is subjected at this point. The end of the longer leaf of each spring is provided with an eye, E, through which passes a suspension-bolt, F, fitted in the lower portion of a double shackle or clip, G. Said shackle is secured to the longitudinal side sill or bar, H, of the running-gear in any approved way. The crossed position of the springs in respect to said cross-piece B may be effected by curving said piece in the center, so as to cause its ends to be out of line with each other. The springs can thus be arranged side by side, and be bolted to the ends of the piece. A straight piece can also be employed, and, in this instance, the spring may be cut away or provided with notched contiguous edges, to enable them to be fitted in this manner. The lower ends of the springs having the eyes may be brought in a direct line with each other by bending the outer portions of the springs toward each other or in opposite directions. The object of having the ends of the springs in line is to enable them to be attached, directly opposite each other, to the side sills, which adds to the appearance or finish of the vehicle having my springs applied thereto. The ends of the springs need not necessarily be in line with each other, and, when so arranged, bending is obviated, as they can be made perfectly straight.

A metallic re-enforcing plate, I, is secured to the under side of the said cross-piece B, said plate being provided with pendent flanges J at its sides. The bolts securing the springs to the cross-piece are located at a short distance from said flanges, and the ends of the springs which project beyond the bolts bear against the flanges, the latter serving thus as bearings or stops for preventing any possible endwise motion of the springs, also as a medium for relieving the spring-attaching bolts from excessive strain. The crossed springs, arranged as shown, enable the carriage-body to move up and down at all times without affecting its horizontal position in the least, for, no matter where the weight predominates, both springs will move in unison with each other, thus obviating the objectionable rocking motion in carriages having the ordinary springs.

In most instances, and especially in vehicles constructed for light road purposes, it is intended to have the side sills to which the springs are attached connected with or rest upon bolsters, though it is apparent that in that class of wagons designed for transporting heavy weights the side sills should rest upon suitable front and rear transverse springs, in which case the end springs will take off the greater portion of the jars and concussions.

What I claim is—

1. The combination of two springs, each composed of one or more leaves, and hinged together at their crossing-point and provided with an eye at one end to connect with the side sills of the running-gear, and at the other end connected with the cross-piece attached to the body of the vehicle, substantially as described.

2. The two leaf-springs, each provided with a socket at their crossing-point, in combination with a pivot or axis-bolt, substantially as described.

3. The combination of two springs, side by side and connected together, with the side sills and cross-piece, for supporting the body in a horizontal position between the side sills, substantially as described.

4. The re-enforcing bearing-plate I, having end flanges, in combination with the cross-piece attached to the body and the connected cross-springs, substantially as described.

5. In combination with the body of a vehicle and the side sills or bars, the two springs crossing each other side by side and attached to a cross-piece, substantially as described.

In testimony that I claim the foregoing I have hereunto set my hand and seal this 20th day of November, 1880.

JOSEPH TILTON. [L. S.]

Witnesses:

W. F. HAPGOOD,

PHILIP J. O'REILLY.